United States Patent
Fields

(10) Patent No.: US 12,013,695 B1
(45) Date of Patent: Jun. 18, 2024

(54) AUTONOMOUS VEHICLE OPERATION BASED ON REAL-TIME ANALYTICS

(71) Applicant: State Farm Mutual Automobile Insurance Company, Bloomington, IL (US)

(72) Inventor: Brian Mark Fields, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 15/596,495

(22) Filed: May 16, 2017

(51) Int. Cl.
G05D 1/00 (2006.01)
B60W 30/18 (2012.01)

(52) U.S. Cl.
CPC ........... *G05D 1/0088* (2013.01); *B60W 30/18* (2013.01); *G05D 1/0214* (2013.01); *G05D 1/0276* (2013.01); *B60W 2420/40* (2013.01); *B60W 2420/403* (2013.01); *B60W 2420/408* (2024.01); *B60W 2420/50* (2013.01); *B60W 2420/54* (2013.01); *B60W 2552/00* (2020.02); *B60W 2554/00* (2020.02); *B60W 2555/20* (2020.02); *B60W 2555/60* (2020.02); *B60W 2556/45* (2020.02); *B60W 2756/10* (2020.02)

(58) Field of Classification Search
None
See application file for complete search history.

(56) References Cited

U.S. PATENT DOCUMENTS 8,831,813 B1 * 9/2014 Ferguson ............ B60W 50/085
  701/28
8,930,229 B2 1/2015 Bowne et al.
  (Continued)

FOREIGN PATENT DOCUMENTS

EP 3239686 11/2017
EP 3578433 A1 4/2019
  (Continued)

OTHER PUBLICATIONS

Final Office Action dated Mar. 16, 2020 for U.S. Appl. No. 15/703,648 "Real-Time Vehicle Driver Feedback Based on Analytics", Fields, 42 pages.
  (Continued)

*Primary Examiner* — Lail A Kleinman
(74) *Attorney, Agent, or Firm* — Lee & Hayes, P.C.

(57) ABSTRACT

Systems and methods are disclosed for operating an autonomous vehicle based on real-time operating data. The operating data may be data about vehicles, drivers, passengers, as well as relevant environmental conditions and contextual data. In some cases, historical data for the preceding data types may be used. The systems and methods may obtain a set of real-time operating data indicative of one or more behaviors of an autonomous vehicle. One or more operations may be performed on the set of real-time operating data. An instruction to modify a particular vehicle operation may be generated based on output from the operations and the one or more behaviors of the autonomous vehicle, and the instruction to modify the particular vehicle operation may be provided to a particular processor that is on-board the vehicle and that controls the particular vehicle operation, to thereby automatically modify the particular vehicle operation.

20 Claims, 6 Drawing Sheets

(56) References Cited

U.S. PATENT DOCUMENTS

| | | | |
|---|---|---|---|
| 9,311,271 B2 | 4/2016 | Wright | |
| 9,424,751 B2 | 8/2016 | Hodges et al. | |
| 9,569,984 B2 | 2/2017 | Stankoulov | |
| 9,633,487 B2 | 4/2017 | Wright | |
| 9,764,742 B1 | 9/2017 | Goldfarb et al. | |
| 9,817,399 B2 | 11/2017 | Braunstein et al. | |
| 9,830,748 B2 | 11/2017 | Rosenbaum | |
| 9,990,782 B2 | 6/2018 | Rosenbaum | |
| 10,192,369 B2 | 1/2019 | Wright | |
| 10,198,879 B2 | 2/2019 | Wright | |
| 10,269,190 B2 | 4/2019 | Rosenbaum | |
| 10,430,695 B2 | 10/2019 | Sathyanarayana et al. | |
| 10,467,824 B2 | 11/2019 | Rosenbaum | |
| 10,493,994 B1 | 12/2019 | Fields | |
| 10,713,717 B1 | 7/2020 | Hanson et al. | |
| 10,915,964 B1 | 2/2021 | Purgatorio et al. | |
| 10,921,805 B2 | 2/2021 | Lin | |
| 11,180,150 B2 | 11/2021 | Engel et al. | |
| 11,227,452 B2 | 1/2022 | Rosenbaum | |
| 11,354,616 B1 | 6/2022 | Fields | |
| 11,407,410 B2 | 8/2022 | Rosenbaum | |
| 11,524,707 B2 | 12/2022 | Rosenbaum | |
| 11,529,959 B1 | 12/2022 | Fields | |
| 11,560,177 B1 | 1/2023 | Fields | |
| 11,594,083 B1 | 2/2023 | Rosenbaum | |
| 11,783,264 B2 | 10/2023 | Fields | |
| 2009/0114463 A1* | 5/2009 | DeVault | B60W 20/12 180/65.29 |
| 2010/0256835 A1* | 10/2010 | Mudalige | G08G 1/164 701/2 |
| 2011/0246010 A1* | 10/2011 | de la Torre Bueno | B60L 50/61 903/902 |
| 2013/0008521 A1 | 1/2013 | Klug et al. | |
| 2013/0211660 A1 | 8/2013 | Mitchell | |
| 2014/0032015 A1 | 1/2014 | Chun et al. | |
| 2014/0162219 A1 | 6/2014 | Stankoulov | |
| 2015/0019266 A1 | 1/2015 | Stempora | |
| 2015/0262435 A1* | 9/2015 | Delong | G07C 5/0816 340/439 |
| 2016/0114698 A1 | 4/2016 | Chow et al. | |
| 2017/0008521 A1* | 1/2017 | Braunstein | G01C 21/3602 |
| 2017/0015318 A1* | 1/2017 | Scofield | G08G 1/07 |
| 2017/0291608 A1* | 10/2017 | Engel | H04W 84/005 |
| 2017/0313332 A1 | 11/2017 | Paget et al. | |
| 2017/0329332 A1* | 11/2017 | Pilarski | B60W 30/0956 |
| 2018/0001899 A1* | 1/2018 | Shenoy | B60W 40/08 |
| 2018/0060970 A1* | 3/2018 | Oduor | G06Q 40/08 |
| 2018/0208195 A1* | 7/2018 | Hutcheson | B60W 30/0956 |
| 2018/0365533 A1 | 12/2018 | Sathyanarayana et al. | |
| 2019/0025826 A1* | 1/2019 | Lin | B60W 50/085 |
| 2019/0031193 A1* | 1/2019 | Kojima | G05D 1/0088 |
| 2022/0092893 A1 | 3/2022 | Rosenbaum | |
| 2022/0300877 A1 | 9/2022 | Fields | |
| 2022/0340148 A1 | 10/2022 | Rosenbaum | |
| 2023/0060300 A1 | 3/2023 | Rosenbaum | |
| 2023/0062843 A1 | 3/2023 | Fields | |
| 2023/0159102 A1 | 5/2023 | Fields | |
| 2023/0419229 A1 | 12/2023 | Fields | |

FOREIGN PATENT DOCUMENTS

| | | |
|---|---|---|
| EP | 3730375 A1 | 4/2020 |
| EP | 3960576 A1 | 3/2022 |
| EP | 4190659 | 6/2023 |
| EP | 4190660 A1 | 6/2023 |
| WO | WO2020193863 | 10/2020 |

OTHER PUBLICATIONS

Final Office Action dated Mar. 23, 2020 for U.S. Appl. No. 15/592,503 "Vehicle Driver Safety Performance Based on Relativity" Fields, 29 pages.

Office Action dated Feb. 22, 2021 for U.S. Appl. No. 15/703,648 "Real-Time Vehicle Driver Feedback Based on Analytics", Fields, 23 pages.

Non Final Office Action dated Mar. 8, 2021 for U.S. Appl. No. 15/592,503, "Vehicle Driver Safety Performance Based on Relativity", Fields, 28 pages.

Office Action for U.S. Appl. No. 15/703,648, dated Nov. 30, 2021, Fields, "Real-Time Vehicle Driver Feedback Based on Analytics", 33 pages.

Non Final Office Action dated Mar. 8, 2021 for U.S. Appl. No. 15/592,503, "Vehicle Driver Safety Performance Based on Relativity", 28 pages.

Office Action for U.S. Appl. No. 15/703,648, dated Jul. 13, 2021, Fields, "Real-Time Vehicle Driver Feedback Based on Analytics", 27 pages.

Keonyup, et al., "Local Path Planning for Off-Road Autonomous Driving With Avoidance of Static Obstacles", IEEE Transactions on Intelligent Transportation Systems, vol. 13, No. 4, 2012, pp. 1599-1616.

Office Action for U.S. Appl. No. 16/669,228, dated Apr. 20, 2022, Fields, "Vehicle Driver Performance Based on Contextual Changes and Driver Response", 11 Pages.

Office Action for U.S. Appl. No. 17/833,410, dated Sep. 22, 2022, Fields, "833Vehicle Driver Safety Performance Based on Relativity", 27 Pages.

Dikmen, et al., "Autonomous Driving in the Real World: Experiences with Tesla Autopilot and Summon, 8th International Conference on Automotive USer Interfaces and Interactive Vehicular Applications", 2016, pp. 225-228.

Pu, et al., "Implementing On-Board Diagnostic and GPS on VANET to Safe the Vehicle", 2015 International Conference on Connected Vehicles and Expo, 2015, pp. 13-18.

Office Action for U.S. Appl. No. 18/053,534, dated Dec. 15, 2023, Brian Mark Fields, "Vehicle Driver Performance Based on Contextual Changes and Driver Response", 10 pages.

Non Final Office Action dated Jul. 22, 2020 for U.S. Appl. No. 15/703,648, "Real-Time Vehicle Driver Feedback Based on Analytics", Fields, 21 pages.

Non Final Office Action dated Aug. 26, 2020 for U.S. Appl. No. 15/592,503, "Vehicle Driver Safety Performance Based on Relativity", Fields, 28 pages.

Office Action for U.S. Appl. No. 17/833,410, dated Jan. 13, 2023, Fields, "Vehicle Driver Safety Performance Based on Relativity", 32 pages Office Action for U.S. Appl. No. 18/100,205, dated Jun. 23, 2023, Fields, "Real-Time Vehicle Driver Feedback Based on Analytics" 14 pages.

\* cited by examiner

AUTONOMOUS VEHICLE OPERATION BASED ON REAL-TIME ANALYTICS

TECHNICAL FIELD

The present disclosure generally relates to systems and methods for operating an autonomous vehicle based on real-time operating data, in particular, generating and providing instructions to modify particular vehicle operations based on real-time operating data.

BACKGROUND

Autonomous, or self-driving, cars are becoming more and more common. An autonomous vehicle is a vehicle that exercises varying levels of control over the capabilities of the vehicle. In particular, an autonomous vehicle is capable of sensing its environment and navigating roadways without human interaction. Autonomous vehicles may exercise control of the vehicle with some driver assistance, partially automate the vehicle, conditionally automate the vehicle, engage in a high degree of automating the vehicle, or fully automate the vehicle.

Autonomous vehicles still struggle with certain tasks and environments. For example, inclement weather may pose a problem for autonomous vehicles, reckless drivers on the road, changes in road conditions (e.g. detours and rerouted roads), problematic segments of roads (e.g. intersections that are known to be busy), as well as making sense of all the data collected on the road as the vehicle travels.

SUMMARY

The present disclosure generally relates to systems and methods for operating an autonomous vehicle based on real-time operating data. Embodiments of example systems and methods are summarized below. The methods and systems summarized below may include additional, less, or alternate actions, including those discussed elsewhere herein.

In one embodiment, a computer-implemented method for operating an autonomous vehicle based on real-time operating data, the method includes obtaining, at one or more processors, a set of real-time operating data indicative of one or more behaviors of the autonomous vehicle. Performing, at the one or more processors, one or more operations on the set of real-time operating data, wherein the one or more operations are based on the set of real-time operating data. Generating, at the one or more processors, an instruction to modify a particular vehicle operation based on output from the operations and the one or more behaviors of the autonomous vehicle; and providing, by the one or more processors, the instruction to modify the particular vehicle operation to a particular processor that is on-board the vehicle and that controls the particular vehicle operation, to thereby automatically modify the particular vehicle operation.

In one embodiment, a computer-implemented method for operating an autonomous vehicle based on real-time operating data, the method includes obtaining, at one or more processors, a set of real-time operating data indicative of one or more behaviors of the autonomous vehicle, wherein the set of real-time operating data obtained from a set of sensors. Performing, at the one or more processors, one or more operations on the set of real-time operating data, wherein the one or more operations are based on the set of real-time operating data. Comparing, at the one or more processors, the output of the one or more operations to a set of vehicle performance data, wherein comparing further comprises identifying alert conditions based on the comparison. Generating, at the one or more processors, an instruction to modify a particular vehicle operation based on the comparison and the one or more behaviors of the autonomous vehicle; and providing, by the one or more processors, the instruction to modify the particular vehicle operation to a particular processor that is at the vehicle and that controls the particular vehicle operation, to thereby automatically modify the particular vehicle operation.

In another embodiment, a system for operating an autonomous vehicle based on real-time operating data, the system including a network interface configured to interface with a processor; a plurality of sensors affixed to the vehicle and configured to interface with the processor; a memory configured to store non-transitory computer executable instructions and configured to interface with the processor; and the processor configured to interface with the memory, wherein the processor is configured to execute the non-transitory computer executable instructions. The non-transitory computer executable instructions cause the processor to obtain a set of real-time operating data indicative of one or more behaviors of the autonomous vehicle; perform one or more operations on the set of real-time operating data, wherein the one or more operations are based on the set of real-time operating data; generate an instruction to modify a particular vehicle operation based on output from the operations and the one or more behaviors of the autonomous vehicle; and provide the instruction to modify the particular vehicle operation to a particular processor that is on-board the vehicle and that controls the particular vehicle operation, to thereby automatically modify the particular vehicle operation.

DETAILED DESCRIPTION

Figure 1A:
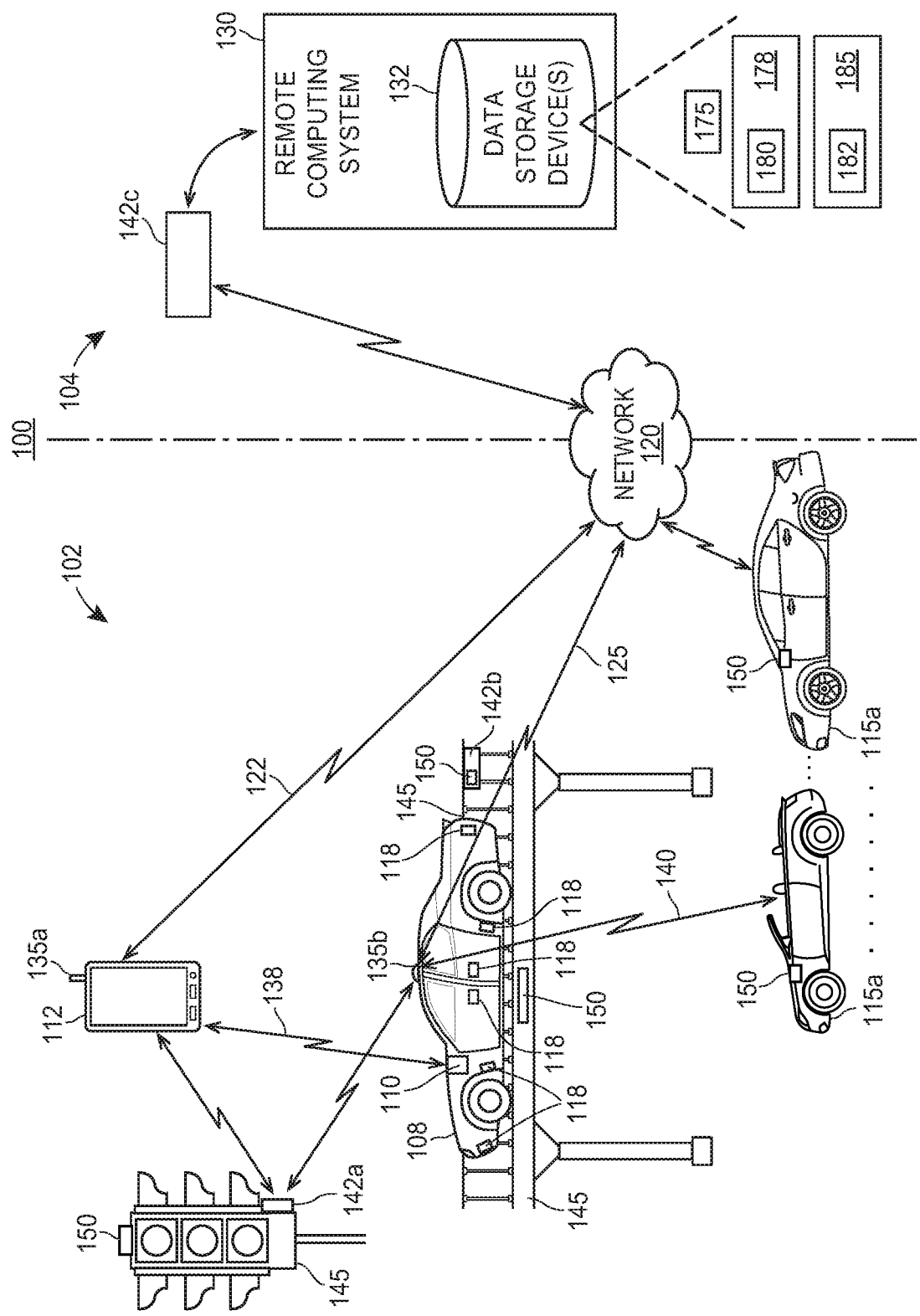
FIG. 1A illustrates a block diagram of an exemplary system for operating an autonomous vehicle based on real-time operating data.

The embodiments disclosed herein are directed to obtaining, in real-time, operating data from a vehicle, performing descriptive and/or prescriptive analytics on the obtained data to determine a result (which may include warnings, recommended actions, etc.), and feeding back the result to the vehicle in real-time to automatically modify an operation of the vehicle, e.g., for an autonomous vehicle. Similarly, when a driver has opted-in to having the vehicle automatically modify various vehicle operations, the results of the analytics may be used as an impetus for the vehicle to take action.

Some embodiments may include obtaining third-party contextual/environmental data as inputs to the analytics.

The real-time operating data may be used to perform operations that help the vehicle operate autonomously. In other embodiments, the real-time operating data is fed back into the systems and methods and presented to the vehicle driver as feedback on the vehicle driver's performance, or the environmental conditions they are operating the vehicle in. This feedback may inform the vehicle driver of potentially hazardous situations before they happen or as they happen, and increase the likelihood of safe operation of the vehicle.

In some embodiments, the real-time operating data may be vehicle driver performance, or vehicle performance data. The driver performance data may be data from a plurality of drivers. A vehicle driver's performance may be based, at least in part, on how quickly a driver notices and compensates for changing driving conditions, and the appropriateness of the driver's temporal, compensatory actions in response to the changes. The vehicle driver contextual response and change data may be derived from mapping time-series data obtained from a vehicle being operated by a driver to time-series, environmental data obtained from third parties to generate new data set indicative of a driver's compensating response to contextual changes (e.g., the driver's time to react to contextual changes (if any), the content and/or magnitude of the driver's reaction, etc.). The driver's compensation response (which may be represented as a score) may be used for various dependent concepts, such as determining insurance premium amounts, providing feedback to driver and/or to vehicle (which may or may not be real-time feedback), providing driver education, etc.

Similarly, a vehicle driver's performance, or a vehicle's performance, may be scored, based, and/or evaluated in relation to other drivers' behavior in similar situations, and/or on relative weights of the respective impact of different contextual conditions on driver safety. The vehicle driver performance relative to other drivers and environmental conditions context data may be used in determining a driver's performance (which may be represented as a score) by collecting the driver's operating data from a vehicle, inputting the driver's operating data into a safe-driver model that has been created based on analytics performed on historical, operating data generated by multiple other drivers, and receiving, as an output from the model, a resulting performance indicator of the driver. The model may be contextual or situational specific, and may provide respective weights for various data attributes. Various data attributes may include traditional attributes (e.g., braking, G-force, etc.) and/or new attributes (e.g., in-vehicle and/or environmental contextual data), and may or may not include time-series data. The resulting performance indicator may be used for various dependent concepts, such as determining insurance premium amounts, providing feedback to the driver and/or the vehicle (which may or may not be real-time feedback), providing driver education, etc.

Vehicle activity data may be used as an input to the autonomous vehicle. The vehicle activity data may include both telematics data, and/or vehicle indicator data. Telematics data may be any data related to monitoring the location, movements, status and behavior of the vehicle. Examples of telematics data are vehicle movement data such as speed, acceleration, cornering, braking, and the like. Vehicle indicator data may be data collected or obtained from the vehicle itself, or any system coupled with the vehicle that tracks the functioning of the vehicle, and the data is indicative of how the vehicle is functioning at a given moment. Similarly, the vehicle indicator data may also be historical data about the functionality of the vehicle. Here functionality of the vehicle may be any data on the current physical state of a component of the vehicle, such as the "wear and tear" of a component, as well as how the component is performing its required tasks and at what level those tasks are being performed. Some examples of vehicle indicator data are wheel speed, engine speed, torque, acceleration, transmission status, fuel levels, oil levels, brake status, cabin status, and any other status data about particular components of the vehicle.

The novel techniques, systems and methods disclosed herein may rely upon both real-time data and static data during their operation. Real-time data may be any data that is updated continuously and immediately after the data is collected. Real-time data is typically delivered near instantaneously after it is collected. There is a minimal amount of lag time between when real-time data is collected and real-time data is delivered. Conversely, static data may be defined as any data that is not real-time data. Static data may be collected in real-time, however, static data is not delivered in real-time. Rather static data may be delivered according to a schedule, such as hourly, daily, weekly, monthly, yearly, etc.

FIG. 1A illustrates a block diagram of an exemplary system 100 for operating an autonomous vehicle based on real-time operating data. The high-level architecture illustrated in FIG. 1A may include both hardware and software applications, as well as various data communications channels for communicating data between the various hardware and software components, as is described below. The system 100 may be roughly divided into front-end components 102 and back-end components 104. The front-end components 102 may obtain information regarding a vehicle 108 (e.g., a car, truck, motorcycle, etc.) that is being operated by a driver, or being operated autonomously, and regarding the context and surrounding environment in which the vehicle 108 is being operated. One or more on-board computers 110 and/or one or more mobile devices 112 that are included in the front-end components 102 and disposed at the vehicle 108 may utilize this information to, for example, notify or alert the driver of the vehicle 108, notify or alert other drivers and other vehicles 115a-115n that are operating in the surrounding environment, automatically change an operating behavior of the vehicle 108 and/or of any one or more of the other vehicles 115a-115n, and/or to assist the driver in operating the vehicle 108. The one or more on-board computers 110 may be permanently or removably installed in the vehicle 108, and the one or more mobile devices 112 may be disposed at and transported by the vehicle 108, for example.

Generally speaking, the on-board computer 110 may be an on-board computing device capable of performing various functions relating to vehicle operations and operating an autonomous vehicle based on real-time operating data. That is, the on-board computer 110 may be particularly configured with particular elements to thereby be able to perform functions relating to operating an autonomous vehicle based on real-time operating data and/or vehicle operations. Further, the on-board computer 110 may be installed by the manufacturer of the vehicle 108, or as an aftermarket modification or addition to the vehicle 108. In FIG. 1A, although only one on-board computer 110 is depicted, it should be understood that in some embodiments, a plurality of on-board computers 110 (which may be installed at one or more locations within the vehicle 108) may be used. However, for ease of reading and not for limitation purposes, the on-board computing device or computer 110 is referred to herein using the singular tense.

The mobile device 112 may be transported by the vehicle 108 and may be, for example, a personal computer or personal electronic device (PED), cellular phone, smart phone, tablet computer, smart watch, wearable electronics, or a dedicated vehicle monitoring or control device which may be releasably attached to the vehicle 108. Although only one mobile device 112 is illustrated in FIG. 1A, it should be understood that in some embodiments, a plurality of mobile devices 112 may be included in the system 100. For ease of reading and not for limitation purposes, though, the mobile device 112 is referred to herein using the singular tense.

Further, it is noted that, in some embodiments, the on-board computer 110 may operate in conjunction with the mobile device 112 to perform any or all of the functions described herein as being performed on-board the vehicle 108. In other embodiments, the on-board computer 110 may perform all of the on-board vehicle functions described herein, in which case either no mobile device 112 is being transported by the vehicle 108, or any mobile device 112 that is being transported by the vehicle 108 is not operatively connected to the vehicle or its sensors. In still other embodiments, the mobile device 112 may perform all of the onboard vehicle functions described herein. Still further, in some embodiments, the on-board computer 110 and/or the mobile device 112 may perform any or all of the functions described herein in conjunction with one or more back-end components 104. For example, in some embodiments or under certain conditions, the mobile device 112 and/or on-board computer 110 may function as thin-client devices that outsource some or most of the processing to one or more of the back-end components 104.

At any rate, the on-board computing device 110 and/or the mobile device 112 disposed at the vehicle 108 may communicatively interface with one or more on-board sensors 118 that are disposed on or within the vehicle 108 and that may be utilized to monitor the vehicle 108 and the environment in which the vehicle 108 is operating. That is, the one or more on-board sensors 118 may sense conditions associated with the vehicle 108 and/or associated with the environment in which the vehicle 108 is operating, and may collect data indicative of the sensed conditions. In some configurations, at least some of the on-board sensors 118 may be fixedly disposed at various locations on the vehicle 108. Additionally or alternatively, at least some of the on-board sensors 118 may be incorporated within or connected to the on-board computer 110. Still additionally or alternatively, in some configurations, at least some of the on-board sensors 118 may be included on or within the mobile device 112. Whether disposed at or on the vehicle 108 or disposed at or on a mobile device 112 being transported by the vehicle 108, though, the one or more of the sensors 118 are generally referred to herein as "on-board sensors 118," and the data collected by the on-board sensors 118 is generally referred to herein as "sensor data," "on-board sensor data," or "vehicle sensor data." The on-board sensors 118 may communicate respective sensor data to the on-board computer 110 and/or to the mobile device 112, and the sensor data may be processed using the on-board computer 110 and/or the mobile device 112 to determine when the vehicle is in operation as well as determine information regarding the vehicle 108, the vehicle's operating behavior, and/or the driver's operating behavior and performance. In some situations, the on-board sensors 118 may communicate respective sensor data indicative of the environment in which the vehicle 108 is operating.

As discussed above, at least some of the on-board sensors 118 associated with the vehicle 108 may be removably or fixedly disposed within or at the vehicle 108 and further may be disposed in various arrangements and at various locations to sense and provide information. The sensors 118 that are installed at the vehicle 108 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 118 (e.g., GPS, accelerometer, or tachometer units) may provide sensor data indicative of, for example, the vehicle's location, speed, position acceleration, direction, responsiveness to controls, movement, etc. Other sensors 118 that are disposed at the vehicle 108 may be directed to the interior or passenger compartment of the vehicle 108, such as cameras, microphones, pressure sensors, weight sensors, thermometers, or similar sensors to monitor the vehicle operator, any passengers, operations of instruments included in the vehicle, operational behaviors of the vehicle, and/or conditions within the vehicle 108. For example, on-board sensors 118 directed to the interior of the vehicle 108 may provide sensor data indicative of, for example, in-cabin temperatures, in-cabin noise levels, data from seat sensors (e.g., indicative of whether or not a person is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. Some of the sensors 118 disposed at the vehicle 108 (e.g., radar, LIDAR, camera, or other types of units that operate by using electromagnetic energy) may actively or passively scan the environment external to the vehicle 108 for obstacles (e.g., other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment. Information or data that is generated or received by the on-board sensors 118 may be communicated to the on-board computer 110 and/or to the mobile device 112, for example.

In some embodiments of the system 100, the front-end components 102 may communicate collected sensor data to the back-end components 104, e.g., via a network 120. For example, at least one of the on-board computer 110 or the mobile device 112 may communicate with the back-end components 104 via the network 120 to allow the back-end components 104 to record collected sensor data and information regarding vehicle usage. The network 120 may include a proprietary network, a secure public internet, a virtual private network, and/or some other type of network, such as dedicated access lines, plain ordinary telephone lines, satellite links, cellular data networks, combinations of these and/or other types of networks. The network 120 may utilize one or more radio frequency communication links to communicatively connect to the vehicle 108, e.g., utilize wireless communication links 122 and 125 to communicatively connect with mobile device 112 and on-board computer 110, respectively. Where the network 120 comprises the Internet or other data packet network, data communications may take place over the network 120 via an Internet or other suitable data packet communication protocol. In some arrangements, the network 120 additionally or alternatively includes one or more wired communication links or networks.

Figure 1B:
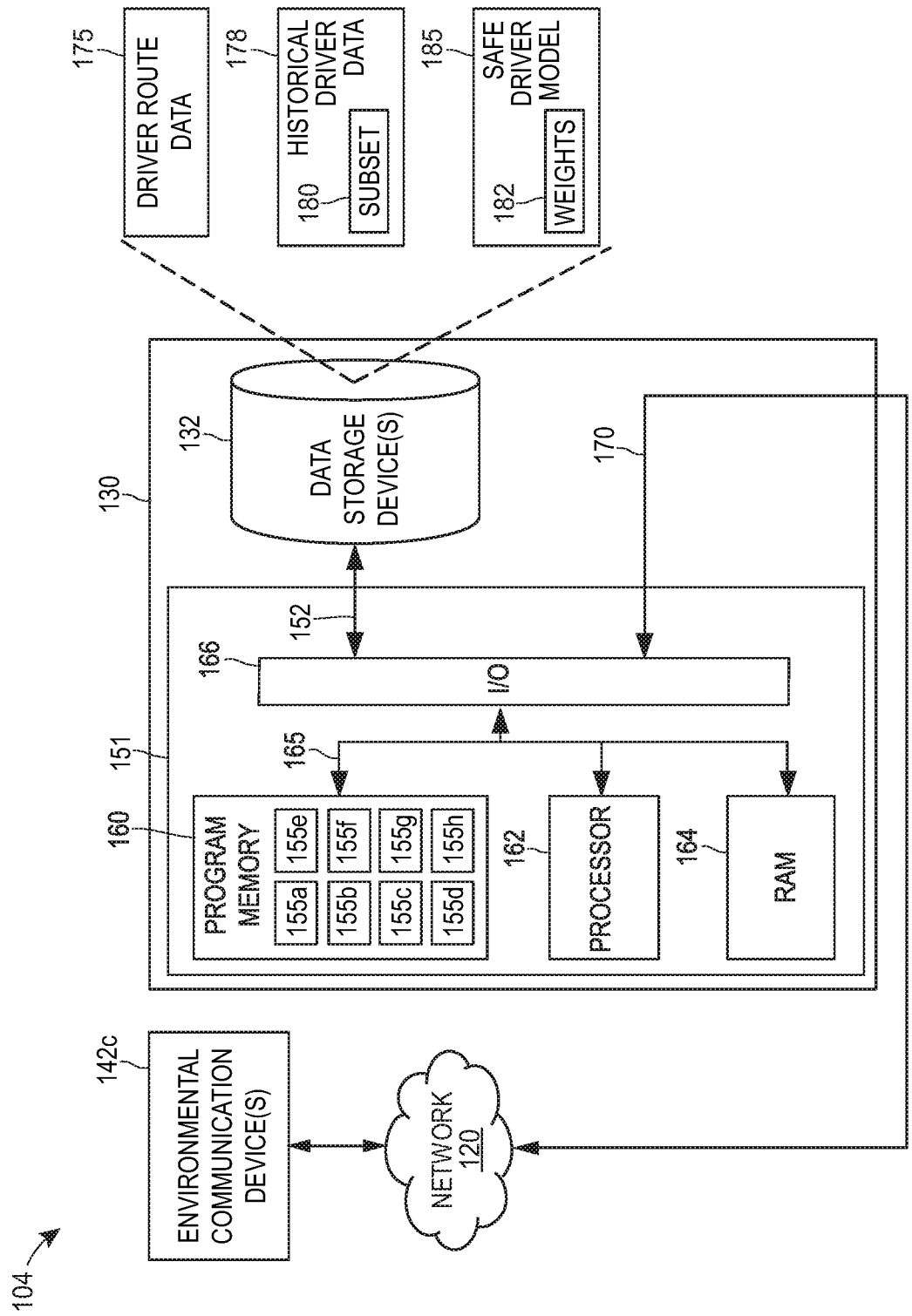
FIG. 1B illustrates a more detailed block diagram of the back-end components of the exemplary system shown in FIG. 1A.

The back-end components 104 include one or more servers or computing devices, which may be implemented as a server bank or cloud computing system 130, and is interchangeably referred to herein as a "remote computing system 130." The remote computing system 130 may include one or more computer processors adapted and configured to execute various software applications and components of the system 100, in addition to other software applications. The remote computing system 130 may further include or be communicatively connected to one or more data storage devices or entities 132, which may be adapted to store data related to the operation of the vehicle 108, driver performance, the environment and context in which the vehicle 108 is operating, and/or other information. For example, the one or more data storage devices 132 may be implemented as a data bank or a cloud data storage system, at least a portion of which may be included in and/or locally accessed by the remote computing system 130 (for example, as illustrated in FIG. 1A) using a local access mechanism such as a function call or database access mechanism, and/or at least a portion of which may be remotely accessed by the remote computing system 130 (for example, as illustrated in FIG. 1B) using a remote access mechanism such as a communication protocol. Thus, although only one data storage device 132 is illustrated in FIGS. 1A and 1B, it is understood that in some embodiments, a plurality of data storage devices or entities 132 may be included in the system 100. For ease of reading and not for limitation purposes, though, the data storage device 132 is referred to herein using the singular tense. The remote computing system 130 may access data stored in the data storage device 132 when executing various functions and tasks associated with the present disclosure.

To communicate with the remote computing system 130 and other portions of the back-end components 104, the front-end components 102 may include one or more communication components 135a, 135b that are configured to transmit information to and receive information from the back-end components 104 and, in some embodiments, transmit information to and receive information from other external sources, such as other vehicles and/or infrastructure or environmental components disposed within the vehicle's environment. The one or more communication components 135a, 135b may include one or more wireless transmitters or transceivers operating at any desired or suitable frequency or frequencies. Different wireless transmitters or transceivers may operate at different frequencies and/or by using different protocols, if desired. In an example, the mobile device 112 may include a respective communication component 135a for sending or receiving information to and from the remote computing system 130 via the network 120, such as over one or more radio frequency links or wireless communication channels 122 which support a first communication protocol (e.g., GSM, CDMA, LTE, one or more IEEE 802.11 Standards such as Wi-Fi, WiMAX, BLUETOOTH, etc.). Additionally or alternatively, the on-board computer 110 may operate in conjunction with an on-board transceiver or transmitter 135b that is disposed at the vehicle 108 (which may, for example, be fixedly attached to the vehicle 108) for sending or receiving information to and from the remote computing system 130 via the network 120, such as over one or more radio frequency links or wireless communication channels 125 which support the first communication protocol and/or a second communication protocol. In some embodiments, the on-board computer 110 may operate in conjunction with the mobile device 112 to utilize the communication component 135a of the mobile device 112 and the link 122 to deliver information to the back-end components 104. In some embodiments, the on-board computer 110 may operate in conjunction with the mobile device 112 to utilize the communication component 135b of the vehicle 108 and the link 125 to deliver information to the back-end components 104. In some embodiments, both communication components 135a, 135b and their respective links 122, 125 may be utilized by the on-board computer 110 and/or the mobile device 112 to communicate with the back-end components 104.

Accordingly, either one or both of the mobile device 112 or on-board computer 110 may communicate with the network 120 over the links 122 and/or 125. Additionally, in some configurations, the mobile device 112 and on-board computer 110 may communicate with one another directly over a link 138, which may be a wireless or wired link.

In some embodiments of the system 100, the on-board computer 110 and/or the on-board mobile device 112 of the vehicle 108 may communicate with respective on-board computers and/or mobile devices disposed at one or more other vehicles 115a-115n, either directly or via the network 120. For example, the on-board computer 110 and/or the mobile device 112 disposed at the vehicle 108 may communicate with other vehicles' respective on-board computers and/or mobile devices via the network 120 and one or more of the communication components 135a, 135b by using one or more suitable wireless communication protocols (e.g., GSM, CDMA, LTE, one or more IEEE 802.11 Standards such as Wi-Fi, WiMAX, BLUETOOTH, etc.). In some configurations, the on-board computer 110 may communicate with a particular vehicle 115a-115n directly in a peer-to-peer (P2P) manner via one or more of the communication components 135a, 135b and the direct wireless communication link 140, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1A by references 142a, 142b, 142c, that are used for monitoring the status of one or more infrastructure components 145 and/or for receiving data generated by other sensors 150 that are associated with the vehicle 108 and disposed at locations that are off-board the vehicle 108. As generally referred to herein, with respect to the vehicle 108, "off-board sensors" or "environmental sensors" 150 are sensors that are not being transported by the vehicle 108. The data collected by the off-board sensors 150 is generally referred to herein as "sensor data," "off-board sensor data," or "environmental sensor data" with respect to the vehicle 108.

At least some of the off-board sensors 150 may be disposed on or at the one or more infrastructure components 145 or other types of components that are fixedly disposed within the environment in which the vehicle 108 is traveling. Infrastructure components 145 may include roadways, bridges, traffic signals, gates, switches, crossings, parking lots or garages, toll booths, docks, hangars, or other similar physical portions of a transportation system's infrastructure, for example. Other types of infrastructure components 145 at which off-board sensors 150 may be disposed may include a traffic light, a street sign, a railroad crossing signal, a construction notification sign, a roadside display configured to display messages, a billboard display, a parking garage monitoring device, etc. Off-board sensors 150 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 115a-115n, pedestrians, and/or other moving objects within the vicinity of the infrastructure component 145, for example.

Additionally or alternatively, at least some of the off-board sensors 150 that are communicatively connected to the one or more infrastructure devices 145 may be disposed on or at one or more other vehicles 115a-115n operating in the vicinity of the vehicle 108. As such, a particular sensor that is disposed on-board another vehicle 115a may be viewed as an off-board sensor 150 with respect to the vehicle 108.

At any rate, the one or more environmental communication devices 142a-142c that are associated with the vehicle 108 may be communicatively connected (either directly or indirectly) to one or more off-board sensors 150, and thereby may receive information relating to the condition and/or location of the infrastructure components 145, of the environment surrounding the infrastructure components 145, and/or of other vehicles 115a-115n or objects within the environment of the vehicle 108. In some embodiments, the one or more environmental communication devices 142a-142c may receive information from the vehicle 108, while, in other embodiments, the environmental communication device(s) 142a-142c may only transmit information to the vehicle 108. As previously discussed, at least some of the environmental communication devices may be locally disposed in the environment in which the vehicle 108 is operating, e.g., as denoted by references 142a, 142b. In some embodiments, at least some of the environmental communication devices may be remotely disposed, e.g., at the back-end 104 of the system 100 as denoted by reference 142c. In some embodiments, at least a portion of the environmental communication devices may be included in (e.g., integral with) one or more off-board sensors 150, e.g., as denoted by reference 142b. In some configurations, at least some of the environmental communication devices 142 may be included or integrated into the one or more on-board communication components 135a, 135b, the on-board computer 110, and/or the mobile device 112 of surrounding vehicles 115a-115n (not shown).

In addition to receiving information from the on-board sensors 118 and off-board sensors 150 associated with the vehicle 108, the on-board computer 110 at the vehicle 108 may directly or indirectly control the operation of the vehicle 108 according to various fully- or semi-autonomous operation features. The autonomous operation features may include software applications or modules implemented by the on-board computer 110 to generate and implement control commands to control the steering, braking, or motive power of the vehicle 108. To facilitate such control, the on-board computer 110 may be communicatively connected to control components of the vehicle 108 by various electrical or electromechanical control components (not shown). When a control command is generated by the on-board computer 110, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

Further, the on-board computer 110 may control one or more operations of the vehicle 108 when the vehicle is operating non-autonomously. For example, the on-board computer 110 may automatically detect respective triggering conditions and automatically activate corresponding features such as traction control, windshield wipers, headlights, braking, etc.

FIG. 1B depicts a more detailed block diagram of the example back-end components 104 of the system 100. As shown in FIG. 1B, the remote computing system 130 included in the back-end components 104 may have a controller 151 that is operatively connected to the data storage device 132 via a link 152, which may be include a local and/or a remote link. It should be noted that, while not shown, additional data storage devices or entities may be linked to the controller 151 in a known manner. For example, separate, additional databases and/or data storage devices (not shown) may be used for various types of information, such as autonomous operation feature information, vehicle accidents, road conditions, vehicle insurance policy information, driver performance, or vehicle use information. Additional databases or data storage devices (not shown) may be communicatively connected to the remote computing system 130 via the network 120, such as databases maintained by third parties (e.g., weather databases, road construction databases, traffic congestion databases, road network databases, IoT (Internet-of-Things) or sensor databases implemented by a city or other jurisdiction, etc.).

The controller 151 may include one or more memories 160 (e.g., one or more program memories 160), one or more processors 162 (which may be called a microcontroller or a microprocessor), one or more random-access memories (RAMs) 164, and an input/output (I/O) circuit 166, all of which may be interconnected via an address/data bus 165. It should be appreciated that although only one microprocessor 162 is shown, the controller 151 may include multiple microprocessors 162. Similarly, the memory of the controller 151 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, optically readable memories, or biologically readable memories, for example. Generally speaking, the RAM 164 and/or the program memories 160 may respectively include one or more non-transitory, computer-readable storage media. The controller 151 may also be operatively connected to the network 120 via a link 170.

The remote computing system 130 may further include a number of applications 155a-155h stored in a program memory 160. In an embodiment, the applications 155a-155h comprise one or more software applications or sets of computer-executable instructions that are stored on the program memory 160 and executable by the processor 162. In an embodiment, at least some of the applications 155a-155h may be implemented at least partially in firmware and/or in hardware at the remote computing system 130.

The various applications 155a-155h on the remote computing system 130 may include, for example, a vehicle monitoring application 155a for receiving sensor data, whether from on-board sensors 118 and/or from off-board sensors 150, that is indicative of the operating behavior of the vehicle 108 and/or of its driver. The remote computing system 130 may also include an environmental monitoring application 155*b* for receiving data, whether from on-board sensors 118, off-board sensors 150, and/or third-party data feeds (not illustrated in FIG. 1A), that is indicative of environmental and contextual conditions in which the vehicle 108 is operating. Additionally, the remote computing system 130 may include an analytics application 155*c* for performing analytics, such as predictive and prescriptive analytics operations on datasets, a feedback application 155*d* for generating and providing feedback for a driver based on real-time operating data, a driver safety performance evaluation application 155*e* for determining a performance of the driver of the vehicle 108, and a real-time communication application 155*f* for communicating information and/or instructions to the vehicle 108 (e.g., to the on-board computing device 110, the mobile device 112, and/or another computing device disposed at the vehicle 108), to other vehicles 115*a*-115*n*, and/or to other computing systems. Other applications at the remote computing system 130 may include, for example, an application for supporting autonomous and/or semi-autonomous vehicle operations 155*g* and/or one or more other applications 155*h* which may support vehicle operations (whether fully-, semi- or non-autonomous) and other functions. Generally speaking, the applications 155*a*-155*h* may perform one or more functions related to providing real-time vehicle driver feedback based on real-time analytics. For example, one or more of the applications 155*a*-155*h* may perform at least a portion of any of the methods described herein.

The various modules or software applications 155*a*-155*h* may be executed on the same computer processor 162 or on different computer processors. Further, while the various applications 155*a*-155*h* are depicted as separate applications, two or more of the applications 155*a*-155*h* may be integrated as an integral application, if desired. In some embodiments, at least one of the applications 155*a*-155*h* may be implemented in conjunction with another application (not shown) that is stored and executed at the remote computing system 130, such as a navigation application.

The data storage device 132 is particularly configured to store various types of data related to and used for providing real-time vehicle driver feedback based on real-time analytics, as well as operating an autonomous vehicle based on real-time operating data. The real-time analytics may be performed on any of the various types of data stored in the data storage device 132. For example, driver route data 175 may be stored at the data storage device 132. Driver route data 175 may include data that is indicative of the behavior of a driver and/or the behavior of the vehicle 108 while the vehicle 108 is being operated over a particular route, e.g., data that is sensed by on-board sensors 118 and/or by off-board sensors 150. Additionally, driver route data 175 may include data that is indicative of contextual or environmental conditions occurring while the vehicle 108 is being operated over the particular route, e.g., data that is provided by onboard sensors 118, off-board sensors 150, and/or third-party data feeds. Generally, each data point included in the driver route data 175 is time-stamped and includes an indication of a respective geo-location at which the data point was collected. That is, at least a portion of the driver route data 175 may include time-series data.

The data storage device 132 may also include historical driver data 178. Historical driver data 178 may include data that is indicative of driving behavior, vehicle operations, and environmental contexts in which multiple vehicles have traveled, e.g., along multiple routes and over multiple periods of time. For example, the historical driver data 178 may include respective driver route data 175 for a plurality of drivers of a plurality of vehicles over a plurality of routes and over a plurality of different periods of time. Each data point included in the historical driver data 178 may be associated with a respective timestamp an indication of a respective geo-location associated therewith, which may be indicative of the time in geo-location at which the data point was collected or obtained. That is, at least a portion of the historical driver data 178 may include time-series data.

In some embodiments, the data storage device 132 may include filtered data 180, which generally is a subset of the historical driver data 178. The historical driver data 178 may be filtered based on one or more conditions or parameters to generate the filtered data 180. For example, the filtered data 180 may be generated by filtering the historical driver data 178 based on a particular route, a time of day of travel, a particular weather condition, an amount of traffic congestion, whether the corresponding vehicle is an automobile or a truck, etc. Additionally or alternatively, the data storage device 132 may store a set of weights 182, which may correspond to various driving conditions and/or parameters. In an embodiment, the set of weights 182 may be included in a safe driver model 185, which may also be stored at the data storage device 182. Descriptions and usage of the filtered data 180, the set of weights 182, and the safe driver model 185 are described in later sections of this disclosure.

Additionally, it is noted that although the system 100 for operating an autonomous vehicle based on real-time operating data is shown in FIGS. 1A and 1B to include one vehicle 108, one mobile device 112, one on-board computer 110, and one remote computing system 130, it should be understood that different numbers of vehicles 108, mobile devices 112, on-board computers 110, and/or remote computing devices or servers 130 may be utilized. For example, the system 100 may include a plurality of servers 130 and hundreds or thousands of mobile devices 112 or on-board computers 110, all of which may be interconnected via the network 120. Furthermore, the database storage or processing performed by the one or more servers 130 may be distributed among a plurality of servers 130 in an arrangement known as "cloud computing." This configuration may provide various advantages, such as enabling near real-time uploads and downloads of information as well as periodic uploads and downloads of information. This may in turn support a thin-client embodiment of the mobile device 112 or on-board computer 110 discussed herein. Further, in some embodiments, any number of other vehicles 115*a*-115*n* may be communicatively connected to and/or included in the system 100, e.g., via the network 120.

Figure 2:
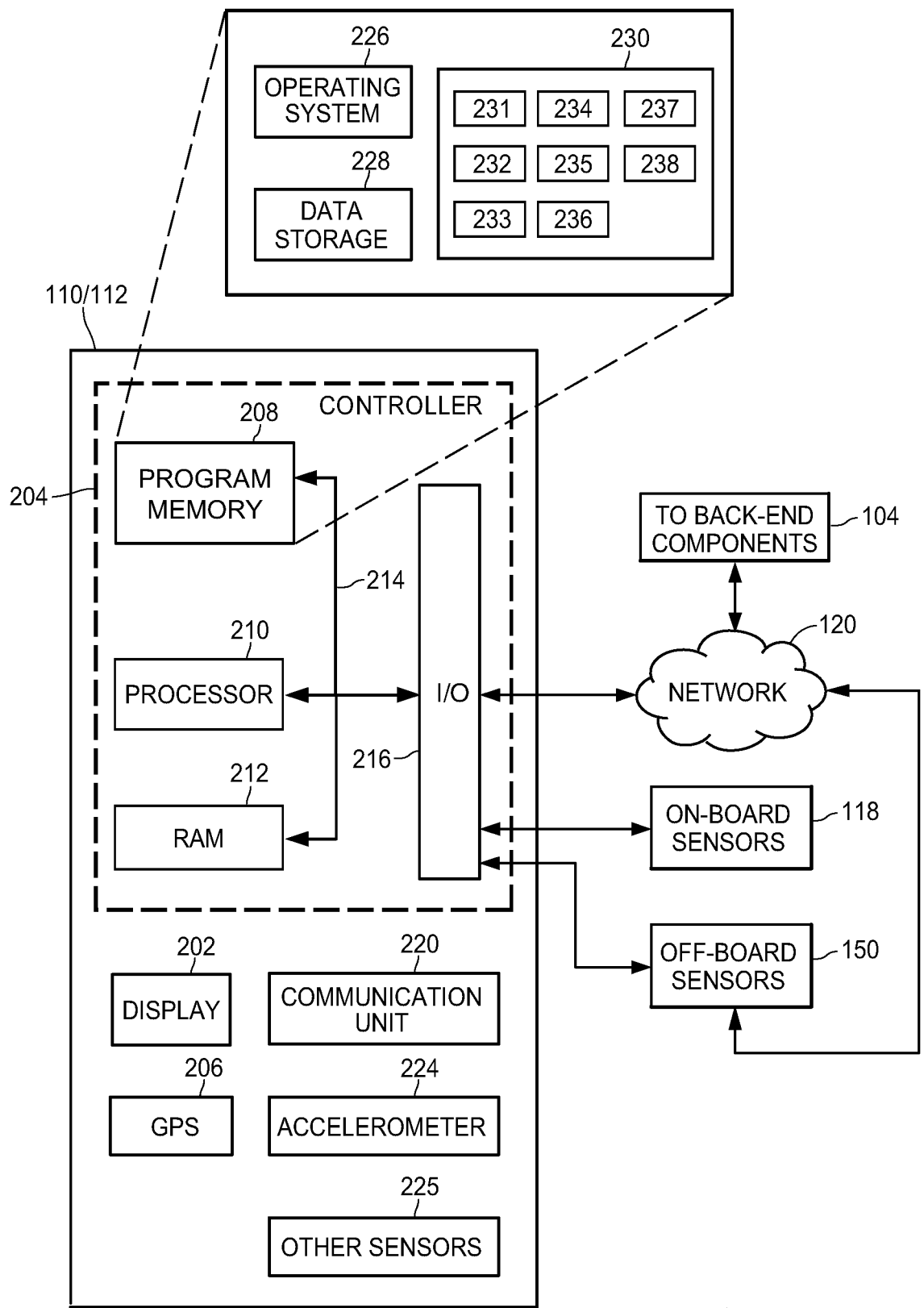
FIG. 2 illustrates a block diagram of an exemplary mobile device or on-board computer that may operate in conjunction with the system of FIGS. 1A and 1B.

FIG. 2 illustrates a block diagram of an exemplary mobile device 112 or an exemplary on-board computer 110 consistent with the system 100. The mobile device 112 or on-board computer 110 may include a display 202, a GPS or other suitable geo-location unit 206, a communication unit 220, an accelerometer 224, one or more additional sensors 225, a user-input device (not shown), and/or a controller 204, similar to the controller 151 in the remote computing system 130. In some embodiments, the mobile device 112 and on-board computer 110 may be integrated into a single device, or either may perform the functions of both. The on-board computer 110/mobile device 112 may interface with one or more on-board sensors 118 that are disposed at the vehicle 108 (but that are separate from the device 110/112) to receive information regarding the vehicle 108 and its environment. Additionally, the on-board computer 110/mobile device 112 may interface with one or more off-board sensors 150 to receive information regarding the vehicle 108 and its environment.

Similar to the controller 151, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, and/or a plurality of software applications 230. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for the on-board computer 110. The data storage 228 may include data such as user profiles and preferences, application data for the plurality of applications 230, and other data related to evaluating driver performance. In some embodiments, the controller 204 may also include, or otherwise be communicatively connected to, other data storage mechanisms (e.g., one or more hard disk drives, optical storage drives, solid state storage devices, etc.) that reside within the vehicle 108 and/or at the remote system 130.

As discussed with reference to the controller 151, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example. Generally speaking, the RAMs 212 and/or the program memories 208 may respectively include one or more non-transitory, computer-readable storage media.

The one or more processors 210 of the device 110/112 may be adapted and configured to execute any of one or more of the plurality of software applications 230 residing in the program memory 204, in addition to other software applications. The various software applications 230 of the device 110/112 may include, for example, a vehicle monitoring application 231 for receiving (whether from on-board sensors 118 and/or from off-board sensors 150) sensor data indicative of the operating behavior of the vehicle 108 and/or of the driver, an environmental monitoring application 232 for receiving (whether from on-board sensors 118, off-board sensors 150, and/or third-party data feeds) data indicative of environmental and contextual conditions in which the vehicle 108 is operating, an analytics application 233 for performing analytics, such as predictive and prescriptive analytics operations on datasets, a feedback application 234 for generating and providing feedback for a driver based on real-time operating data, a driver safety performance evaluation application 235 for determining a performance of the driver of the vehicle 108, and a real-time communication application 236 for communicating information and/or instructions to the vehicle 108 (e.g., to another computing device or system disposed at the vehicle 108), to other vehicles 115a-115n, to the remote computing system 130, to other back-end components 104 of the system 100 such as the environmental communication device 142c, and/or to other computing systems. Other applications that are executed at the device 110/112 may include, for example, an application for supporting autonomous and/or semi-autonomous vehicle operations 237 and/or one or more other applications 238 which may support vehicle operations (whether fully-, semi-, or non-autonomous). Generally speaking, the applications 230 may perform one or more functions related to evaluating driver safety performance. For example, one or more of the applications 230 may perform at least a portion of any of the methods described herein. In some embodiments, one or more of the applications 230 may operate in conjunction with one or more of the applications 155a-155h at the remote computing system 130 to perform one or more functions related to evaluating driver safety performance. For example, one or more of the applications 231-238 at the device 110/112 may be implemented as a thin-client that operates in conjunction with one or more of the applications 231-238 at the remote computing system.

The various software applications 230 may be executed on the same computer processor 210 or on different computer processors. Further, while the various applications 231-238 are depicted as separate applications, two or more of the applications 231-238 may be integrated as an integral application, if desired. In some embodiments, at least one of the applications 231-238 may be implemented in conjunction with another application (not shown) that is stored and executed at the device 110/112, e.g., a navigation application, a user interface application, etc.

In addition to the communicative connections to the on-board sensors 118 that are disposed at the vehicle 108 but not at, on, or within the device 110/112 itself, the device 110/112 may include additional on-board sensors 118 that are integral with the device 110/112, such as the GPS unit 206 and/or the accelerometer 224, which may provide information regarding the operation of the vehicle 108. Such integral sensors 118 may further include one or more sensors of a sensor array 225, which may include, for example, one or more cameras, additional accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, direction, and/or other parameters associated with movements of the vehicle 108.

Furthermore, the communication unit 220 of the device 110/112 may communicate with other vehicles 115a-115n, infrastructure or environmental components 142, 145, back-end components 104, or other external sources of information to transmit and receive information relating to providing real-time vehicle driver feedback based on real-time analytics. For example, the communication unit 220 may be included in or may include one or more of the communication components 135a, 135b shown in FIG. 1A. Additionally or alternatively, the communication unit 220 may be included in or may include an instance of the environmental communication component 142 shown in FIG. 1A. The communication unit 220 may communicate with the external sources via the network 120 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Further, the communication unit 220 may provide input signals to the controller 204 via the I/O circuit 216. The communication unit 220 may also transmit sensor data, device status information, control signals, or other output from the controller 204 to one or more sensors 118 within the vehicle 108, mobile devices 112, on-board computers 110, off-board sensors 150, environmental communication devices 142, and/or remote servers 130.

Further, the mobile device 112 or the on-board computer 110 may include a user-input device (not shown) for receiving instructions or information from the vehicle operator, such as settings, selections, acknowledgements, etc. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 3:
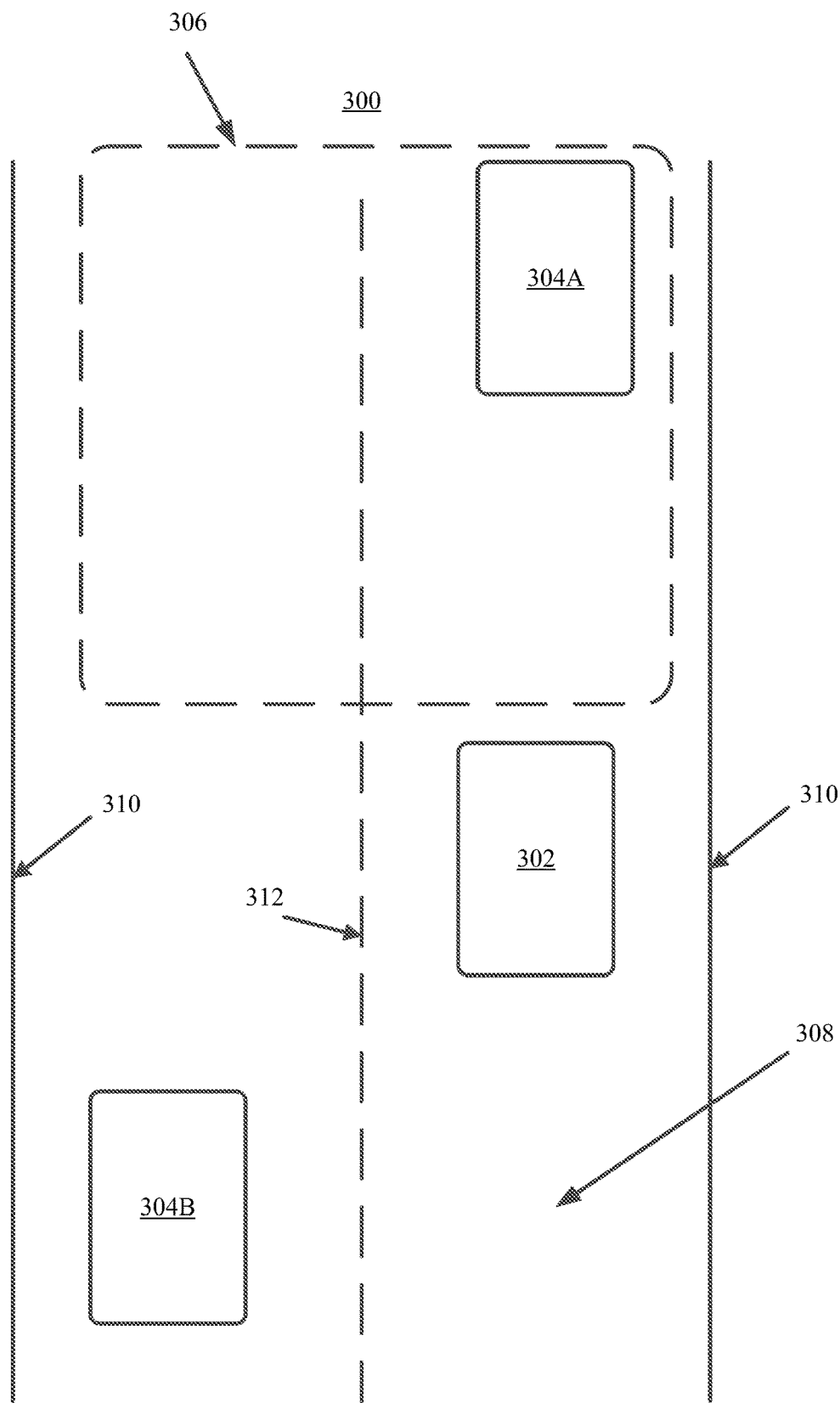
FIG. 3 depicts an exemplary scenario illustrating operating an autonomous vehicle based on real-time operating data.

FIG. 3 depicts an example scenario 300 illustrating operating an autonomous vehicle based on real-time operating data. FIG. 3 includes an example scenario 300 with an autonomous vehicle 302 driving along a road 308. The vehicle may be the vehicle 108 described above. The figure further includes other vehicles 304A and 304B, a driving event 306, the road 308, a side to the road 310, and a center line 312 for the road. The other vehicles 304A and 304B may be the vehicles 115a described above. The road 308 may be any type of road that the vehicle 302 may be travelling along. For example, the road 308 may be: highways, roads, horse trails, cycleways, footpaths, foreshoreways, greenways, hiking trails, long-distance trails, right of ways (e.g. an easement on a piece of land), running courses, sidewalks, snowshoe trails, towpaths, and wilderness trails. Similarly, the real-time operating data may include data that is collected on the characteristics (e.g. length, location, visibility, etc.) of the road 308, the sides of the road 310, and the centerline 312 for the road.

The example scenario 300 may illustrate the operation of a system for operating an autonomous vehicle (AV), such as the vehicle 302, using real-time operating data. The operation of the system may be performed by systems coupled to a vehicle such as the remote computing system 130 and/or on-board computer 110/mobile device 112 described in FIGS. 1A-2. In particular, the software applications 155g and 155h may be used to execute some or all of the functionality of the system. The vehicle 302 may by default be operated by a human driver with the functionality allowing the vehicle to take over operation based on the real-time operating data, or the vehicle 302 may operate autonomously by default and carry a human passenger.

During operation of the vehicle 302, the vehicle may obtain a set of real-time operating data indicative of one or more behaviors of the vehicle 302. The data may originate from the onboard sensors 118 and/or off-board sensors 150 described above. For example, real-time operating data obtained from off-board sensors 150 may be transmitted by the remote computing system 130 to the vehicle 302 via the communication component 135b over the network 120.

The set of real-time operating data may be indicative of one or more detected real-time behaviors of the vehicle 302. For example, the real-time operating data may be data that is indicative of the operation of the vehicle 302, such as vehicle driver contextual response and change data, vehicle driver performance relative to other drivers and environmental conditions or contexts data, and vehicle activity data. Alternatively, the real-time operating data may also be data that is relevant to the operation of the vehicle 302, for example, weather data indicating the current weather conditions under which the vehicle 302 is driving, or the conditions of the roads on which the vehicle 302 is driving. The obtained data may include data which indicates that according to the way the vehicle 302 is being operated the vehicle is behaving in a particular manner which may be a safety concern. For example, utilizing contextual data related to the road the vehicle 302 is currently driving on combined with the speed of the vehicle 302 it may be determined that the vehicle 302 is currently speeding. Speeding, braking too quickly, turning with too small a turn radius or too quickly, skidding, and driving erratically, are all examples of particular behaviors that the data may indicate the vehicle 302 is engaged in.

Similarly, how the vehicle driver is driving the vehicle 302 may be compared to how other vehicles, such as vehicles 304A and 304B are, or have been driven, driving under similar conditions. Accordingly, the set of real-time operating data may be characterized as contextual data, relativity data, vehicle indicator data, or combinations thereof. In some cases, the vehicle indicator data may be telematics data, activity data, or a combination of both. These particular sets of real-time operating data may be obtained from one or more sensors affixed to the vehicle.

As part of the process of obtaining the real-time data, the vehicle 302, may detect real-time behaviors from the real-time operating data. Detecting real-time behaviors of the vehicle 302, or the vehicle driver, may include performing queries, potentially in conjunction with the remote computing system 130, to determine if the set of real-time operating data indicates real-time behaviors which may be of concern. These real-time behaviors may be pre-identified, that is stored and accessible by the vehicle 302 as behaviors to watch for, or they may be detected and identified in real-time based on the contextual data received by the vehicle 302. Additionally, or alternatively, detecting real-time behaviors may include comparing the obtained real-time operating data for the vehicle 302 to a historical dataset of operating data for the vehicle 302, or for other similarly situated vehicles 304A and 304B.

The vehicle 302 may perform one or more operations, such as analytics operations, on the set of real-time operating data, wherein the one or more operations are based on the set of real-time operating data. In some embodiments, the vehicle 302 may perform the analytics operations in conjunction with the remote computing system 130. In particular, the application 155c described above may be used to perform the operations. The analytics operations may include descriptive, predictive, and/or prescriptive analytics. The operations may be performed at the vehicle 302, at the remote computing device 130, or at a combination of both. The analytics operations may produce a result based on the real-time operating data which indicates what the current real-time operating condition for the vehicle 302 is, what future operating conditions may be, and what future operating conditions should be. The types of analytics operations used by the vehicle 302 may be based on the set of real-time operating data.

In some embodiments, performing one or more analytics operations may include obtaining a set of historical operating data for the vehicle. The set of historical operating data may be stored at the vehicle 302, the remote computing system 130, or at third party sources, such as an insurance provider for the driver of the vehicle 302 or the vehicle itself. The set of historical operating data for the vehicle may be analyzed to identify one or more alert conditions, and the one or more detected real-time behaviors of the vehicle may be compared to the one or more alert conditions to determine the danger to the vehicle 302. The alert conditions may be determined in advance by the vehicle driver according to their driving preferences, or in some instances the alert conditions may be determined by an insurance provider which provides vehicle insurance for the vehicle 302. In some cases, the one or more alert conditions are predetermined based on an analysis of the set of historical operating data for the vehicle 302. The historical operating data may contain data indicative of prior dangerous driving events. The alert conditions may be based on a driving event 306 that requires the vehicle 302 to operate in a particular manner.

The driving event 306 may be an instance of inclement weather that is occurring along the route the vehicle 302 is driving, road conditions that are occurring along the route, erratic drivers of other vehicles along the route, an accident along the route, a history of accidents along the route, a high level, or abnormal level, of traffic along the route, or combinations thereof. What is or is not considered a driving event 306 may be determined in advance by the vehicle driver working with the vehicle 302, or by an insurance provider for the vehicle 302, another party, and/or by the vehicle 302 based on the vehicle driving history. Whether or not a driving event 306 is considered by the vehicle when performing operations may be dependent upon the location, visibility, and other characteristics of the road 308, the sides of the road 310, the centerline 312 for the road, and how those factors relate to the vehicle 302 and other vehicles on the road 308.

In some embodiments, the real-time operating data may include driver route data (e.g., driver route data 175) that is associated with a vehicle, such as the vehicle 302. Generally speaking, the driver route data 175 may include data that is indicative of a behavior of the vehicle 108, a behavior of the driver of the vehicle 302, and/or various contextual and environmental conditions occurring while the vehicle is operated along a particular route over a particular time period or interval. The driver route data 175 may include data collected from one or more sensors that are disposed on-board the vehicle 302 (e.g., the on-board sensors 118), data collected from one or more sensors that are disposed off-board the vehicle 302 (e.g., the off-board sensors 150), and/or third-party generated data that is indicative of environmental and/or contextual conditions occurring along the particular route during the particular time period or interval. Third-party data may include, for example, data that is stored in databases maintained by third parties, e.g., weather databases, road construction databases, traffic congestion databases, road network databases, IoT or sensor databases implemented by a city or other jurisdiction, etc., and that is provided via a data feed to the system 100, e.g., via the network 120. Some or all of the data points included in the driver route data 175 may include respective indications of a time and a geo-location at which the data point was collected or observed. That is, at least some of the driver route data 175 may be time-series data.

The driver route data 175 may include data that is indicative of a vehicle's position, speed, acceleration, direction, movement, and/or responsiveness to controls. Additionally or alternatively, the driver route data 175 may include data that is indicative of users and/or human presence within the vehicle 302, such as data indicative of in-cabin temperatures, in-cabin noise levels, data from seat sensors (e.g., indicative of whether or not a person is using a seat, and thus the number of passengers being transported by the vehicle 302), data from seat belt sensors, data regarding the operations of user controlled devices such as windshield wipers, defrosters, traction control, mirror adjustment, interactions with on-board user interfaces, etc. In some embodiments, the driver route data 175 may include data that is indicative of various contextual or environmental conditions of the particular route during the particular time interval, e.g., weather changes and/or conditions, road conditions, road configurations (e.g., merging lanes, construction zones, etc.), traffic density, pedestrian density, density of other humans (e.g., cyclists, skateboarders, etc.), posted speed limits and other traffic signs/lights, school zones, railroad tracks, traffic accidents, etc.

The historical driver data 178 that includes data indicative of driving behavior, vehicle operations and behavior, and/or environmental conditions and contexts obtained for multiple drivers of multiple vehicles along multiple routes and over multiple periods or intervals of time. The historical driver data 178 may be stored at and accessed from the data storage device 132, for example, e.g., by utilizing any suitable local access mechanism (e.g., a function call, a database read, an API (Application Programming Interface), etc.) and/or any suitable remote access mechanism (e.g., a message exchange using a communication protocol, a remote API, etc.). In an embodiment, the historical driver data 178 may include respective driver route data 175 corresponding to a plurality of drivers of a plurality of vehicles over a plurality of routes and over a plurality of different periods of time or different time intervals. At least some of the historical driver data 178 may have been generated by and/or collected from multiple sets of sensors associated with multiple vehicles 108, 115a-115n (e.g., on-board sensors 118, off-board sensors 150, etc.). At least some of the historical driver data 178 may include third-party data that may have been generated and provided by one or more third-party data providers. Typically, third-party data includes data that is indicative of one or more environmental or contextual conditions occurring along various routes in various intervals of time. Third-party data may include, for example, data from weather databases, road construction databases, traffic congestion databases, road network databases, IoT or sensor databases implemented by a city or other jurisdiction, etc. Third-party data may be stored in databases maintained by third-parties (e.g., a party or entity other than that providing the system 100), and the third-party data may be provided to the system 100, e.g., as a data feed via the network 120. In an embodiment, each data point included in the historical driver data 178, whether sensed or obtain via third party, may have a respective timestamp and indication of a respective geo-location associated therewith, which may be indicative of the time and geo-location at which the respective data point was collected or obtained. As such, at least a portion of the historical driver data 178 may be time-series data.

In other embodiments, performing one or more analytics operations may include obtaining, a set of environmental data, and a set of contextual data, and analyzing the set of environmental data, the set of contextual data, and the real-time operating data for the vehicle. The analysis may show that the vehicle is potentially operating in an unsafe manner given the environmental and contextual data. In yet other embodiments, performing one or more analytics operations may include obtaining a set of historical operating data for at least one other vehicle, and analyze a set of historical operating data for at least one other vehicle and the real-time operating data for the vehicle.

In some embodiments, the vehicle 302 may compare the output of the one or more operations to a set of vehicle performance data, wherein comparing further comprises identifying alert conditions based on the comparison. The comparison and the identified alert conditions may be used as part of the process of generating instructions for operating the vehicle 302.

The vehicle 302 may generate an instruction to modify a particular vehicle operation based on output from the operations, such as the analytics operations described above, and the one or more behaviors of the vehicle 302. The instruction may be generated by the software applications 155g and 155h described above. The instruction to modify the particular vehicle operation may be a dynamic driving task, such as a tactical driving task, an operational driving task, or both. A operational driving task may include controlling the operation of the vehicle's steering, braking, acceleration, as well as how the vehicle 302 monitors the roadway and environmental and contextual conditions. A tactical driving task may include responding to events, such as the driving event 306, determining when to change lanes, turning the vehicle 302, as well as using the turn signals for the vehicle 302.

Once the instruction to modify the particular vehicle operation is generated by the vehicle 302, the instruction is provided to a particular processor that is on-board the vehicle 302 and that controls the particular vehicle operation, to thereby automatically modify the particular vehicle operation. The instruction may be provided by software applications 155g and 155h described above. In some embodiments, the instruction to modify the particular vehicle operation may be presented to a passenger, or vehicle driver, in the vehicle. The passenger may select the instruction to indicate to the vehicle 302 to execute the instruction. In other embodiments, the vehicle operation is automatically executed without interaction from the passenger. Whether or not the instruction to modify is presented to a passenger may be dependent upon the real-time operating data, the results of the one or more operations, or the type of driving event 306.

Figure 4:
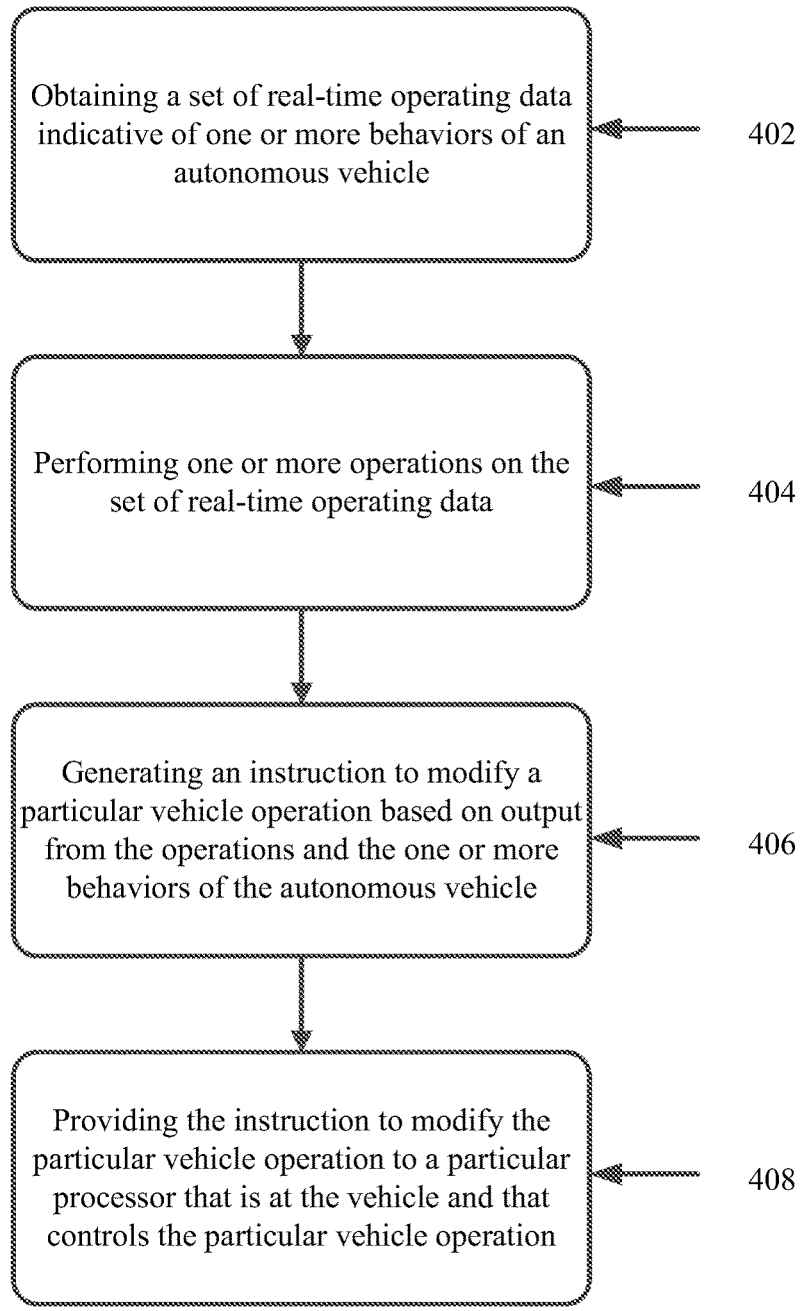
FIG. 4 depicts an exemplary flow diagram for operating an autonomous vehicle based on real-time operating data.

FIG. 4 depicts an exemplary flow diagram for operating an autonomous vehicle based on real-time operating data. The steps of the method 400 may be performed by systems coupled to a vehicle such as the remote computing system 130 and/or on-board computer 110/mobile device 112 described in FIGS. 1A-3. The method 400 may include additional, fewer, or alternative actions, including those described elsewhere herein.

The method 400 for operating an autonomous vehicle based on real-time operating data includes obtaining a set of real-time operating data indicative of one or more behaviors of the autonomous vehicle (block 402); performing one or more analytics operations on the set of real-time operating data, wherein the one or more analytics operations are based on the set of real-time operating data (block 404); generating an instruction to modify a particular vehicle operation based on results from the analytics operations and the one or more behaviors of the autonomous vehicle (block 406); and providing the instruction to modify the particular vehicle operation to a particular processor that is on-board the vehicle and that controls the particular vehicle operation, to thereby automatically modify the particular vehicle operation (block 408).

In some embodiments, the set of real-time operating data may be contextual data, relativity data, vehicle indicator data, or combinations thereof. Accordingly, the vehicle indicator data may be telematics data, activity data, or a combination of both. These different types of data are described above. As such, the set of real-time operating data may be obtained from one or more sensors affixed to the vehicle, such as the sensors described herein.

In some embodiments, performing one or more analytics operations may include obtaining a set of historical operating data for the vehicle; analyzing the set of historical operating data for the vehicle; identifying one or more alert conditions based on the analysis; and comparing the one or more alert conditions to the one or more detected real-time behaviors of the vehicle. Additionally, the one or more alert conditions may be predetermined based on an analysis of the set of historical operating data for the vehicle.

In other embodiments, performing one or more analytics operations further includes obtaining a set of environmental data, and a set of contextual data; and analyzing, at the one or more processors, the set of environmental data, the set of contextual data, and the real-time operating data for the vehicle. Alternatively, performing one or more analytics operations may include obtaining a set of historical operating data for at least one other vehicle; and analyzing a set of historical operating data for at least one other vehicle and the real-time operating data for the vehicle.

In some embodiments, the instruction to modify the particular vehicle operation is a tactical driving task. In other embodiments, the instruction to modify the particular vehicle operation is an operational driving task. In yet other embodiments, the instruction to modify the particular vehicle operation is a combination of both an operational driving task, and tactical driving task.

Figure 5:
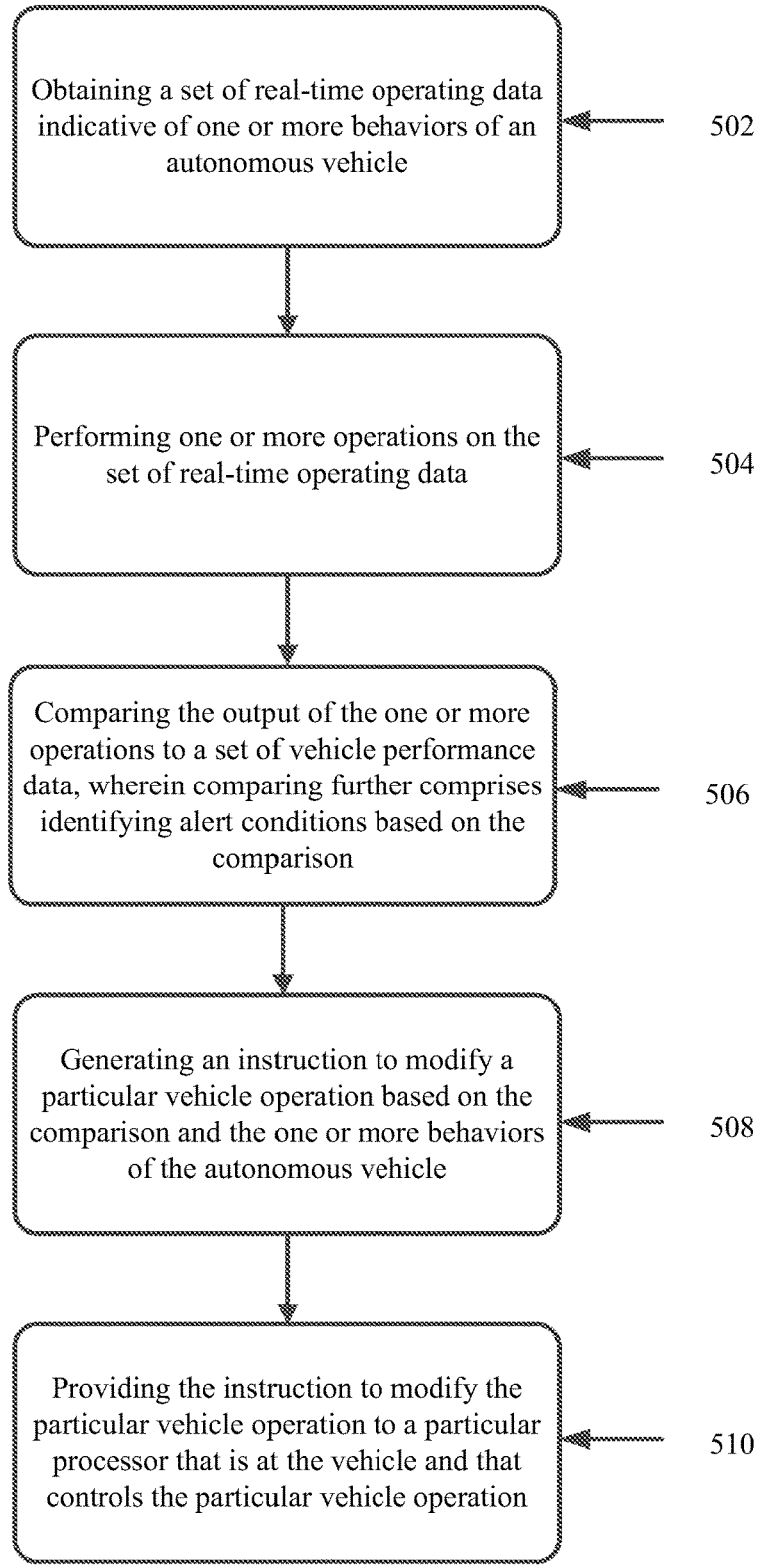
FIG. 5 depicts an exemplary flow diagram for operating an autonomous vehicle based on real-time operating data.

FIG. 5 depicts an exemplary flow diagram for operating an autonomous vehicle based on real-time operating data. The steps of the method 500 may be performed by systems coupled to a vehicle such as the remote computing system 130 and/or on-board computer 110/mobile device 112 described in FIGS. 1A-3. The method 500 may include additional, fewer, or alternative actions, including those described elsewhere herein.

The method 500 for operating an autonomous vehicle based on real-time operating data includes obtaining a set of real-time operating data indicative of one or more behaviors of the autonomous vehicle obtained from a set of sensors (block 502); performing one or more operations on the set of real-time operating data, wherein the one or more operations are based on the set of real-time operating data (block 504); comparing the output of the one or more operations to a set of vehicle performance data, wherein comparing further comprises identifying alert conditions based on the comparison (block 506); generating an instruction to modify a particular vehicle operation based on the comparison and the one or more behaviors of the autonomous vehicle (block 508); and providing the instruction to modify the particular vehicle operation to a particular processor that is on-board the vehicle and that controls the particular vehicle operation, to thereby automatically modify the particular vehicle operation (block 510).

In some embodiments, the set of real-time operating data for the vehicle further comprises relativity data, vehicle indicator data, or combinations of both. For example, the real-time operating data may be any of the relativity data examples listed above and/or the vehicle indicator data listed above.

In some embodiments of the method, performing one or more operations includes identifying a real-time driving behavior for the vehicle based on comparing a set of contextual data and the real-time operating data. For example, the contextual data is used as a benchmark by which the real-time operating data is analyzed to determine if the vehicle is performing in a certain manner.

In some embodiments, the set of set of real-time operating data comprises vehicle performance data for at least one other vehicle, historical vehicle performance data for the vehicle, or a combination of both. The vehicle performance data for the at least one other data may be data for a similar vehicle stored in a database maintained by an insurer of the vehicle, or historical vehicle performance data that is stored at the vehicle, at a separate location from the vehicle, or stored at a combination of both locations. The historical data may be specific single trips taken by the vehicle, a series of trips taken by the vehicle, or an average of the same trip taken multiple times, or trips taken along road segments.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for operating an autonomous vehicle based on real-time operating data, the method comprising:

obtaining, by one or more processors, real-time operating data indicating operating conditions of the autonomous vehicle during a current trip;

determining, by the one or more processors and based on a geographic location of the autonomous vehicle, first environmental data indicating one or more first weather conditions encountered by the vehicle as it traverses a current route during the current trip;

obtaining, by the one or more processors, contextual data comprising historical weather data indicating weather conditions encountered by the autonomous vehicle during a previous trip taken along a first route, wherein the first route is different from the current route associated with the current trip;

obtaining, by the one or more processors, other data associated with other vehicles operating in an environment surrounding the autonomous vehicle, the other data comprising (i) other real-time operating data indicating one or more behaviors of the other vehicles during the current trip, and (ii) historical operating data indicating past behaviors of the other vehicles during at least one trip taken along a second route different from the current route;

selecting, by the one or more processors, from a plurality of models, and based at least in part on the first environmental data, a first model characterized by a first plurality of weights associated with the real-time operating data, the contextual data, and the other data;

determining, by the one or more processors, using the first model, and based at least in part on the first plurality of weights, the real-time operating data, the contextual data, and the other data, a first real-time safety threshold corresponding to the one or more first weather conditions;

determining, by the one or more processors and based at least in part on the real-time operating data, that the operating conditions of the vehicle satisfy the first real-time safety threshold;

determining, by the one or more processors and during the current trip, second environmental data, different from the first environmental data, indicating a change in the one or more first weather conditions to one or more second weather conditions along the current route;

selecting, by the one or more processors, from the plurality of models, and based at least in part on the second environmental data, a second model characterized by a second plurality of weights, different from the first plurality of weights;

determining, by the one or more processors and using the second model, a second real-time safety threshold corresponding to the one or more second weather conditions;

determining, by the one or more processors and based at least in part on the real-time operating data, that a particular vehicle operating condition exceeds the second real-time safety threshold;

determining, by the one or more processors, an instruction to modify a particular vehicle operation as the vehicle continues to traverse the current route during the current trip, based at least in part on the determining that the particular vehicle operating condition exceeds the second real-time safety threshold; and providing, by the one or more processors, the instruction to a particular processor that is on-board the autonomous vehicle and that controls the particular vehicle operation, the instruction, when executed by the particular processor, causing the particular processor to modify the particular vehicle operation.

2. The computer-implemented method of claim 1, wherein the real-time operating data is obtained from one or more sensors affixed to the autonomous vehicle.

3. The computer-implemented method of claim 1, further comprising:
   obtaining, by the one or more processors, a set of historical operating data associated with the autonomous vehicle;
   analyzing, by the one or more processors, the set of historical operating data;
   identifying, by the one or more processors and based at least in part on the analyzing, one or more alert conditions; and
   comparing, by the one or more processors, the one or more alert conditions to the real-time operating data, wherein the instruction is determined based at least in part on the comparing.

4. The computer-implemented method of claim 3, wherein the one or more alert conditions are predetermined based on an analysis of the set of historical operating data associated with the autonomous vehicle.

5. The computer-implemented method of claim 1, wherein the instruction is one of:
   a tactical driving task comprising responding to a driving event, wherein the driving event is pre-determined by a driver of the autonomous vehicle or by an insurance provider, or
   an operational driving task comprising controlling steering, braking, acceleration or monitoring operations of the autonomous vehicle.

6. A computer-implemented method for operating an autonomous vehicle based on real-time operating data, the method comprising:
   obtaining, by one or more processors, a set of real-time operating data indicating operating conditions of the autonomous vehicle during a current trip, and first environmental data indicative of one or more first weather conditions encountered by the vehicle as it traverses a current route during the current trip, and wherein the set of real-time operating data is obtained from a set of sensors;
   obtaining, by the one or more processors, a set of contextual data comprising historical weather data indicating weather conditions encountered by the autonomous vehicle during a previous trip taken along a first route, wherein the first route is different from the current route associated with the current trip;
   obtaining, by the one or more processors, other data associated with other vehicles operating in an environment in which the autonomous vehicle is driving, the other data comprising (i) other real-time operating data indicating one or more behaviors of the other vehicles during the current trip, including other driver performance, and (ii) historical operating data indicating past behaviors of the other vehicles during at least one trip taken along a second route different from the current route;
   selecting, by the one or more processors, from a plurality of models, and based at least in part on the first environmental data, a first model characterized by a first plurality of weights associated with the real-time operating data, the contextual data, and the other data;
   determining by the one or more processors, using the first model, and based on the first plurality of weights, the real-time operating data, the contextual data, and the other data, a first real-time safety threshold corresponding to the one or more first weather conditions;
   determining, by the one or more processors and based at least in part on the real-time operating data, that the operating conditions of the vehicle satisfy the first real-time safety threshold;
   determining, by the one or more processors and during the current trip, second environmental data, different from the first environmental data, indicating a change in the one or more first weather conditions to one or more second weather conditions along the current route;
   selecting, by the one or more processors, from the plurality of models, and based at least in part on the second environmental data, a second model characterized by a second plurality of weights, different from the first plurality of weights;
   determining, by the one or more processors and using the second model, a second real-time safety threshold corresponding to the one or more second weather conditions;
   determining, by the one or more processors and based at least in part on the real-time operating data, that a particular vehicle operating condition exceeds the second real-time safety threshold;
   determining, by the one or more processors, an instruction to modify a particular vehicle operation as the vehicle continues to traverse the current route during the current trip, of the autonomous vehicle based at least in part on the determining that the particular vehicle operating condition exceeds the second real-time safety threshold; and
   providing, by the one or more processors, the instruction to a particular processor that is associated with the autonomous vehicle and that controls the particular vehicle operation, the instruction, when executed by the particular processor, causing the particular processor to modify the particular vehicle operation.

7. The computer-implemented method of claim 6, wherein the set of real-time operating data for the autonomous vehicle further comprises one or more of:
   relativity data comprising operating data of vehicles operating under the one or more weather conditions, or
   vehicle indicator data comprising a current physical state of a component of the autonomous vehicle.

8. A system for operating an autonomous vehicle based on real-time operating data, the system comprising:
   a processor;
   a plurality of sensors carried by the autonomous vehicle and configured to interface with the processor; and
   a memory configured to store non-transitory computer executable instructions and configured to interface with the processor, wherein the processor is configured to execute the non-transitory computer executable instructions to cause the processor to:
      obtain a set of real-time operating data indicating operating conditions of the autonomous vehicle during a current trip;
      determine first environmental data indicative of one or more first weather conditions encountered by the vehicle as it traverses a current route during the current trip;
      obtain a set of contextual data comprising historical weather data indicating weather conditions encountered by the autonomous vehicle during a previous trip taken along a first route, wherein the first route is different from the current route associated with the current trip;

obtain other data associated with the other vehicles, the other data comprising (i) other real-time operating data indicating one or more behaviors of the other vehicles during the current trip, and (ii) historical operating data indicating past behaviors of the other vehicles during at least one trip taken along a second route different from the current route;

select from a plurality of models, and based at least in part on the first environmental data, a first model characterized by a first plurality of weights associated with the real-time operating data, the contextual data, and the other data;

determine, using the first model, and based at least in part on the first plurality of weights, the real-time operating data, the contextual data, and the other data, a first real-time safety threshold corresponding to the one or more first weather conditions;

determine based at least in part on the real-time operating data, that the operating conditions of the vehicle satisfy the first real-time safety threshold;

determine, during the current trip, second environmental data, different from the first environmental data, indicating a change in the one or more first weather conditions to one or more second weather conditions along the current route;

select, from the plurality of models, and based at least in part on the second environmental data, a second model characterized by a second plurality of weights, different from the first plurality of weights;

determine, using the second model, a second real-time safety threshold corresponding to the one or more second weather conditions;

determine, based at least in part on the real-time operating data, that a particular vehicle operating condition exceeds the second real-time safety threshold;

determine an instruction to modify a particular vehicle operation of the autonomous vehicle as the vehicle continues to traverse the current route during the current trip, based at least in part on the determining that the particular vehicle operating condition exceeds the second real-time safety threshold; and provide the instruction to a particular processor that is associated with the autonomous vehicle, the instruction, when executed by the particular processor, causing the particular processor to modify the particular vehicle operation.

9. The computer-implemented method of claim 1, wherein the operating data comprise an indication of at least one of: a condition of a road the autonomous vehicle is traversing, a turn radius, a turning speed, or skidding.

10. The computer-implemented method of claim 1, wherein determining the first real-time safety threshold and the second real-time safety threshold further comprises:

generating, by the one or more processors and based on the other data, a context-specific model indicative of real-time safety thresholds corresponding to one or more weather conditions, wherein the first real-time safety threshold and the second real-time safety threshold are determined based at least in part on the context-specific model.

11. The computer-implemented method of claim 1, wherein determining the second real-time safety threshold further comprises:

identifying, by the one or more processors, a portion of the historical operating data indicating past behaviors of the other vehicles operating in conditions substantially similar to the second one or more weather conditions; and generating, by the one or more processors and based on the other data, a context-specific model, wherein the instruction is determined based at least in part on the context-specific model.

12. The computer-implemented method of claim 1, further comprising:

determining, by the one or more processors, a vehicle response to changes in the one or more weather conditions from the one or more first weather conditions to the one or more second weather conditions during the current trip;

determining, based at least in part on the vehicle response, a vehicle performance score; and determining an insurance premium amount based at least in part on the vehicle performance score.

13. The computer-implemented method of claim 12, wherein the vehicle response comprises one or more of:

a length of time from a change in the weather conditions and a reaction by the vehicle, a content of the reaction, and a magnitude of the reaction.

14. The computer-implemented method of claim 3, wherein identifying the one or more alert conditions further comprises:

identifying, by the one or more processors and based on the set of historical operating data, one or more driving events, wherein the one or more driving events comprises at least one of: inclement weather, an accident, high level of traffic, road condition, or erratic driving of other vehicles.

15. The computer-implemented method of claim 1, further comprising:

obtaining, by the one or more processors, an indication that a driver of the autonomous vehicle has opted-in to automatic modification of vehicle operations, the vehicle operations including a lane change and a turn operation, wherein providing the instruction is based on obtaining the indication.

16. The computer-implemented method of claim 1, wherein the real-time operating data for the autonomous vehicle further comprises vehicle indicator data indicative of a current status of oil levels, fuel levels, or cabin conditions of the autonomous vehicle.

17. The computer-implemented method of claim 1, wherein:

the other data further comprises weather data indicating weather conditions encountered by the other vehicles during the at least one trip taken along the second route different from the current route; and the first real-time safety threshold is determined based at least in part on the weather conditions encountered by the other vehicles during the at least one trip taken along the second route different from the current route.

18. The computer-implemented method of claim 1, further comprising:

determining, based on the second environmental data, a subset of the contextual data comprising historical weather data indicating similar weather conditions, wherein the second real-time safety threshold is determined based at least in part on the subset.

19. The computer-implemented method of claim 1, further comprising:
- determining, by the one or more processors and based at least in part on the real-time operating data, the contextual data, and the other data, at least one of:
  - current operating conditions of the autonomous vehicle,
  - predicted future operating conditions of the autonomous vehicle, or
  - desired future operating conditions of the autonomous vehicle.

20. The computer-implemented method of claim 1, wherein the second plurality of weights include:
- a first weight corresponding to the real-time operating data,
- a second weight corresponding to the contextual data, and
- a third weight corresponding to the other data.

\* \* \* \* \*